April 4, 1961
A. W. LANE
2,977,806
GYROSCOPIC APPARATUS
Filed Oct. 13, 1958
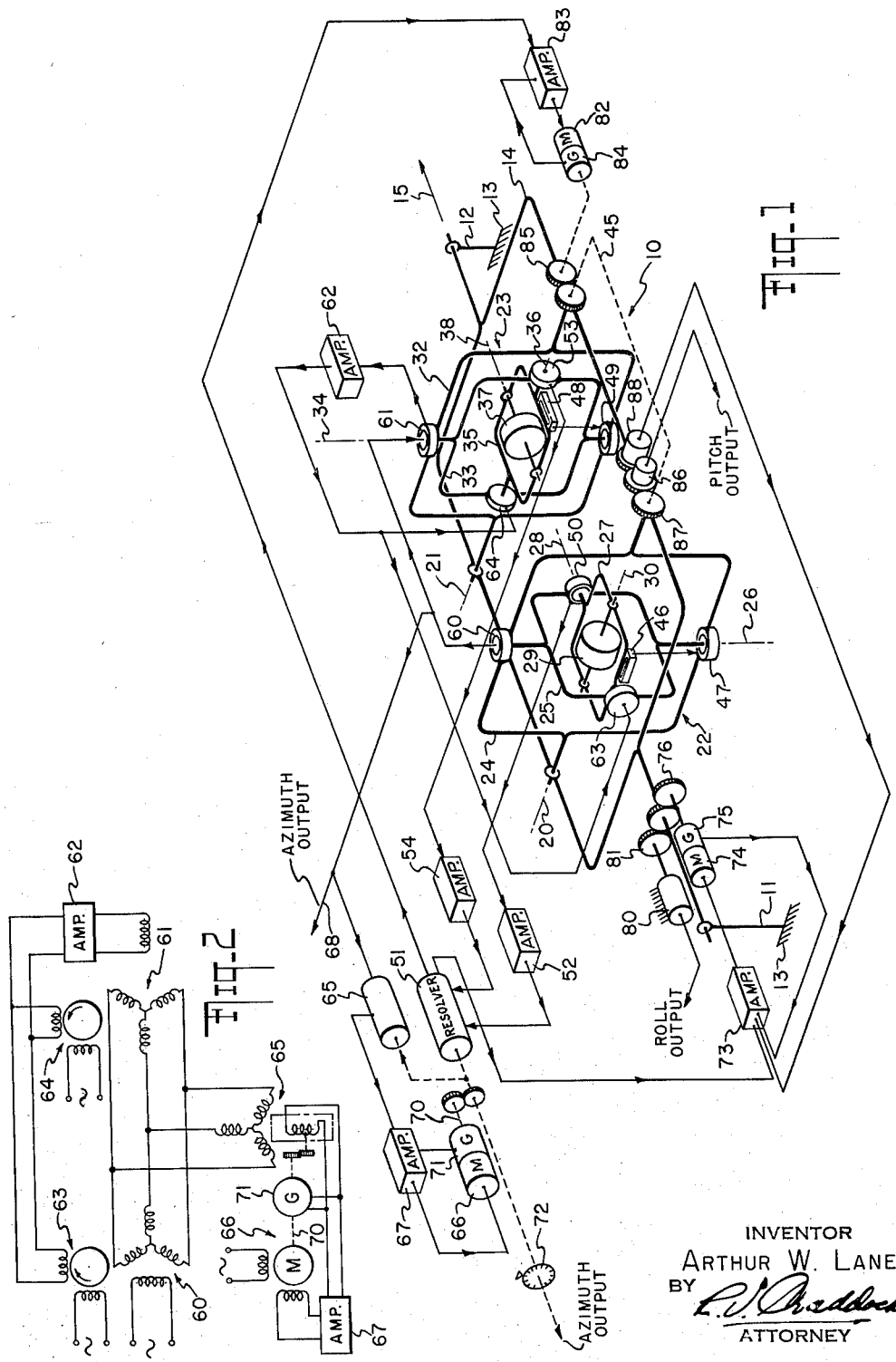
INVENTOR
ARTHUR W. LANE
BY
ATTORNEY United States Patent Office 2,977,806
Patented Apr. 4, 1961

2,977,806
GYROSCOPIC APPARATUS
Arthur W. Lane, Roosevelt, N.Y., assignor to Sperry Rand Corporation, Great Neck, N.Y., a corporation of Delaware
Filed Oct. 13, 1958, Ser. No. 766,958
8 Claims. (Cl. 74—5.34)

This invention relates to gyroscopic apparatus and, more particularly, relates to improving the accuracy of the reference signals from gyroscopic apparatus by providing an accurate composite reference measure that is the average of a plurality of substantially identical reference data.

An individual gyroscope embodying a universally suspended mass rotated at high speed may be employed for establishing a stable reference with respect to two perpendicular reference axes in space. However, a gyroscope is subject to variations in orientation, known as drift, due to disturbing forces which cannot be entirely eliminated. The undesirable gyroscopic drift introduces generally cumulative errors into the reference data supplied by the gyroscope to the control and indicating devices.

Prior art systems endeavoring to reduce gyroscopic drift have generally designated one of two similar gyroscopes to be the master while slaving the other gyroscope to it. This arrangement is objectionable in that the output thereof has only the character of the master gyroscope.

It is a primary object of the present invention to provide apparatus to improve the accuracy of gyroscopically-derived reference data by minimizing the effects of the undesired gyroscopic drift.

Another object of the present invention is to provide a gyroscopic device adapted to provide a reference measure which is the average of substantially identical reference data.

It is a further object of the present invention to provide an extremely accurate reference measure from a plurality of gyroscopic reference devices which are continuously urged in a direction to eliminate error with respect to the reference measure.

It is an additional object of the present invention to provide a three-axis reference platform providing an extremely accurate average reference measure about corresponding reference axes.

The above objects of the present invention are achieved by providing at least two gyroscopes with one of the gyroscopes having at least one of its reference axes normally oriented in a predetermined angular relation with respect to the corresponding reference axis of the other gyroscope whereby said gyroscopes are adapted to provide substantially duplicate information with respect to said axes. The gyroscopes may be incorporated within a stable reference device such as a two-gyro stable platform or they may be remotely located with respect to each other. A measure proportional to the deviations of the reference axes from their predetermined orientations is utilized to precess the gyroscopes equally in a direction to eliminate the deviation error. By obtaining a measure indicative of the position of at least one of the continuously oriented reference axes, a highly accurate reference measure proportional to the average of the substantially duplicate information is provided. Depending upon the axes selected, extremely accurate measures of the heading, pitch, and roll of navigable craft may be provided.

Although the available redundancy in gyro stabilized axes, when utilizing at least a pair of gyroscopes, can be used to improve drift about any reference axis, it is particularly advantageous around the azimuth axis when the gyros are acting as free gyroscopes. Further optimum navigational accuracy is more directly sensitive to heading errors than to pitch or roll verticality errors. An additional advantage of a gyro stable platform comprising two directional gyros is due to the drift in pitch and roll being governed by drift around the directional gyro inner axes or by torques about the directional gyro vertical outer axes. Because the torque sensitive axes are vertically oriented, they are insensitive to mass unbalance of the gimbal systems which are acted on by gravity or other vertical accelerations. Thus favorable orientation of these axes results in considerably lower drift rates from the vertical than is possible in a gyro stable platform utilizing one vertical gyro and one directional gyro.

In order to clearly bring forth the advantages of the present invention, particularly with respect to a gyro stable platform, a preferred embodiment of the present invention will be described for purposes of example with reference to a two-directional gyro stable platform mounted in an aircraft, as shown in the accompanying drawings, wherein, Fig. 1 is a perspective view illustrative of a preferred embodiment of the present invention as applied to a two-gyro platform, and Fig. 2 is a diagrammatic view of the circuitry for the electrical components of a portion of Fig. 1.

Referring now to Fig. 1, a gyro stable platform 10 is mounted for movement on spaced posts 11 and 12 which may represent a housing fixed to the airframe 13. The outer roll gimball 14 of stable platform 10 is mounted by trunnion-bearing connections on posts 11 and 12 to pivot around an axis 15 that is coincident with the fore-and-aft axis of the aircraft about which the aircraft rolls.

Mounted on gimbal 14 by means of trunnion-bearing connections to pivot around axes 20 and 21, respectively, are substantially identical directional gyroscope assemblies 22 and 23. Spaced axes 20 and 21 are disposed perpendicular to axis 15 and are normally parallel with the athwartship axis of the craft about which the aircraft pitches. The outer pitch gimbal 24 of directional gyroscope assembly 22 is mounted by trunnion-bearing connections on gimbal 14 to pivot about axis 20. The inner vertical gimbal 25 of assembly 22 is pivoted in trunnion-bearing connections on gimbal 24 for movement about an axis 26 that is perpendicular to axis 20 and is vertical and normally parallel to the vertical axis of the craft about which the aircraft yaws. The inner horizontal gimbal 27 of assembly 22 is mounted by trunnion-bearing connections on gimbal 25 to rotate about an axis 28 that is perpendicular to axis 26 and which is shown for convenience of explanation to be coincident with axis 15. The rotor 29 of directional gyroscope assembly 22 is mounted for rotation by trunnion-bearing connections on inner gimbal 27 to spin about a normally horizontal axis 30 perpendicular to axis 28. For convenience of explanation, axis 30 is shown coincident with axis 20.

Referring now to directional gyroscope assembly 23, the outer pitch gimbal 32 thereof is mounted by trunnion-bearing connections on gimbal 14 to pivot about axis 21. The inner vertical gimbal 33 of assembly 23 is pivoted on gimbal 32 in trunnion-bearing connections for movement about an axis 34 that is perpendicular to axis 21 and is vertical and normally parallel to the vertical axis of the craft. The inner horizontal gimbal 35 of assembly 23 is mounted by trunnion-bearing connections on gimbal 33 to rotate about an axis 36 that is perpendicular to axis 34 and is shown for convenience of explanation to be coincident with axis 21. The rotor 37 of assembly 23 is mounted by trunnion-bearing connections on inner gimbal 35 to spin about a normally horizontal axis 38 perpendicular to axis 36. Axis 38 is shown for convenience of explanation to be coincident with axis 15. A mechanical link 45 connects the outer pitch gimbal 24 of assembly 22 to the outer pitch gimbal 32 of assembly 23 in order that pitch gimbals 24 and 32 move in synchronism.

In the preferred embodiment shown, the spin axis 30 of rotor 29 is normally disposed substantially perpendicular with respect to the spin axis 38 of rotor 37. By so arranging the spin axes 30 and 38, the assemblies 22 and 23 may be adapted to provide roll and pitch as well as substantially duplicate heading information. For example, in the special condition shown with spin axis 30 aligned with axis 20, assembly 22 may be adapted to be responsive to roll and heading changes while assembly 23, with its spin axis 38 aligned with axis 15, may be adapted to be responsive to pitch and heading changes in a manner to be described.

An electrolytic tilt detector 46 is mounted on the inner horizontal gimbal 27 of assembly 22 to be responsive, in the condition shown, to the tilt of spin axis 30 from the horizontal in the vertical plane perpendicular to the roll axis 15. Tilt detector 46 is connected to provide a signal indicative of tilt to a torque motor 47. The torque motor 47 is mounted on gimbal 24 to provide a torque about axis 26 to precess the rotor 29 to maintain spin axis 30 thereof in a horizontal condition. Similarly, an electrolytic tilt detector 48 is mounted on inner horizontal gimbal 35 of assembly 23 to detect the tilt of the spin axis 38 from the horizontal in the vertical plane perpendicular to the pitch axis 21. Tilt detector 48 is connected to provide a signal to a torque motor 49 mounted on the outer pitch gimbal 32 to provide a torque about axis 34 to precess the rotor 37 to maintain the spin axis 38 thereof in a horizontal condition.

To provide a signal proportional to the lack of perpendicularity of the inner vertical gimbal 25 with respect to the inner horizontal gimbal 27 of assembly 22, a pick-off 50 has its stator mounted on gimbal 25 and its armature adapted to be rotated by the movement of gimbal 27. The output of pick-off 50 is connected to a resolver 51 through an amplifier 52. The resolver 51 may be of the type described in Patent No. 2,591,697 of Hays, Jr., entitled "Stable Reference Apparatus" issued April 8, 1952.

To provide a signal indicative of the lack of perpendicularity between the inner vertical gimbal 33 and the inner horizontal gimbal 35 of assembly 23, a pick-off 53 has its stator connected to gimbal 33 and its armature rotated with gimbal 35. The signal from pick-off 53 is connected to the resolver 51 through an amplifier 54.

In accordance with the teachings of the preferred embodiment of the present invention, it is desired to obtain substantially duplicate signals indicative of the heading of the craft and then to obtain the average of said substantially duplicate signals to provide an extremely accurate composite azimuth measure. This is accomplished by mounting the stator of a synchro transmitter 60 on pitch gimbal 24 of assembly 22 with the rotor of synchro 60 adapted to rotate with vertical gimbal 25 about axis 26. In a similar manner, the stator of a syncho control transformer 61 is mounted on gimbal 32 of assembly 23 with the rotor of synchro 61 adapted to be rotated by the movement of vertical gimbal 33 around the axis 34. Each of the synchros 60 and 61 provides a signal indicative of heading of the craft. As shown more clearly in Fig. 2, the stator windings of synchro transmitter 60 are connected to the corresponding stator windings of synchro control transformer 61. The rotor winding of synchro 61 is so mounted on gimbal 33 that the synchro data transmission system comprising synchros 60 and 61 provides no output when the spin axes 30 and 38 are perpendicular with respect to each other. When the spin axes 30 and 38 are not perpendicular, an output proportional to the algebraic summation of the deviations of said axes from said perpendicular orientation is provided by synchro 61.

The output of synchro 61 is connected to the input of phase sensitive amplifier 62. The output of amplifier 62 is connected to torque motor 63 which has its stator mounted on gimbal 25 and is adapted to provide a torque around axis 28 to precess rotor 29 around the axis 26. The output of amplifier 62, with its polarity reversed, is also connected to torque motor 64 mounted on gimbal 33 to provide a torque around axis 36 to precess the rotor 37 around axis 34.

The stator windings of synchro 60 are also connected to the corresponding stator windings of synchro control transformer 65 and to lead 68. The output from the rotor of synchro control transformer 65 is connected to drive motor 66 through phase sensitive summing amplifier 67. The output shaft 70 of motor 66 is connected to drive rate generator 71. The output of generator 71 is connected in feedback fashion to the input of amplifier 67 to provide a stabilization signal. The output shaft of motor 66 is also connected to drive the rotor of synchro control transformer 65 and the rotor of resolver 51 through a suitable gear reduction. The output shaft 70 may be connected through appropriate gearing to drive a compass card 72 which is read against a fixed lubber line to provide an indication of craft heading. The output shaft 70 may also be connected to drive any mechanism requiring azimuth information, such as an automatic flight control system or other navigation device.

With the assemblies 22 and 23 aligned in the positions as shown, the outputs of pick-offs 50 and 53 will be measures indicative of the true roll and pitch respectively of the aircraft. However, the spin axes 30 and 38 of assemblies 22 and 23, respectively, may be in any position with respect to the fore-and-aft and athwartship axes of the aircraft, depending upon the heading of the craft and normally would not be aligned as shown. At all times, however, the spin axes 30 and 38 are maintained substantially perpendicular to each other for reasons to be more fully explained later. With the spin axes 30 and 38 perpendicular with respect to each other but in any arbitrary position, the output from the pick-offs 50 and 53 are merely indicative of the perpendicularity of the gimbal 25 with respect to gimbal 27 and gimbal 33 with respect to gimbal 35, respectively, in terms of space coordinates. In order to transpose the aforementioned outputs from space coordinates to aircraft coordinates to determine the true roll and pitch of the aircraft, the signals from pick-offs 50 and 53 are resolved in resolver 51 in terms of the heading of the aircraft in a manner more fully explained in the aforementioned Patent No. 2,591,697.

The output of the resolver 51 indicative of the roll error is connected to phase sensitive summing amplifier 73 which in turn is connected to energize motor 74. The output shaft of motor 74 is connected to drive rate generator 75 which is connected to provide a stabilization signal in feedback fashion to amplifier 73. The output shaft of motor 74 is also connected to position the outer roll gimbal 14 through gearing 76 to maintain gimbal 14 horizontal. The rotor of roll synchro 80 is connected to be driven through gearing 81 in accordance with the movement of gimbal 14 around axis 15. The stator of roll synchro 81 is fixed to the airframe thus providing an output from synchro 80 proportional to the true roll of the aircraft.

Similarly, the output of the resolver 51 indicative of the pitch error is connected to drive motor 82 through phase sensitive summing amplifier 83. The output shaft of motor 82 is connected to drive rate generator 84 which, in turn, is connected to provide a stabilization signal in feedback fashion to amplifier 83. The output shaft of motor 82 is also connected to simultaneously drive pitch gimbals 24 and 32 through reduction gearing 85 to maintain gimbals 24 and 32 vertical. The stator of pitch synchro 86 is mounted on gimbal 14, while the rotor thereof is connected through gearing 87 to be rotated in accordance with the position of the gimbals 24 and 32. Synchro 86 thus provides an output that is indicative of the true pitch of the aircraft.

Also mounted on gimbal 18 is a potentiometer 88 having its wiper arm driven by gearing 87 in accordance with the position of the pitch gimbals 24 and 32. The output of the potentiometer 88 is connected to the input of summing amplifier 73 to provide a compensation signal in accordance with the disclosure of Patent No. 2,756,598 to E. B. Hammond, Jr., entitled "Gyro Roll Compensating System," issued July 31, 1956, to modify the roll correction signal as a function of the pitch angle.

In the operation of the preferred embodiment of the present invention shown in Fig. 1, when starting up the system by suitable conventional means not shown, the gyroscope assemblies 22 and 23 may be in any haphazard position. The tilt detectors 46 and 48 detect any tilt of the assemblies 22 and 23 to provide signals to torque motors 47 and 49 to precess the gyro in a manner to bring the spin axes 30 and 38, respectively, to a horizontal condition. Simultaneously, while the rotors 29 and 37 are being brought up to speed, synchros 60 and 61 detect a lack of perpendicularity between spin axes 30 and 38, respectively, and provide an orthogonality deviation signal to amplifier 62.

The amplified deviation signal from amplifier 62 drives torque motor 63 in one direction in order to precess the spin axis 30 in a horizontal plane around axis 26. The output of amplifier 62, with its polarity reversed, drives torque motor 64 in the opposite direction with respect to torque motor 63 to precess the spin axis 38 in a horizontal plane around axis 34 until axes 30 and 38 become perpendicular with respect to each other. In a relatively short time, by the aforementioned action, the spin axes 30 and 38 are horizontal and perpendicular with respect to each other.

Once the spin axes 30 and 38 of assemblies 22 and 23 have been precessed to perpendicular positions with respect to each other, they tend to maintain that condition in space due to gyroscopic rigidity or inertia and to provide substantially duplicate azimuth information except for gyroscopic drift. As the gyroscope assemblies 22 and 23 drift, the spin axes 30 and 38 will tend to deviate from their perpendicular condition with respect to each other. The synchro data transmission system which comprises synchros 60 and 61 senses the composite deviation. Synchro 60 is responsive to the deviation of spin axis 30 while synchro 61 is responsive to the deviation of spin axis 38. By connecting the synchros 60 and 61 as described, the output of synchro 61 is an orthogonality deviation signal proportional to the composite deviation between the spin axes 30 and 38. The deviation signal is amplified in amplifier 62 to drive torque motor 63 in one direction and torque motor 64 in the opposite direction to precess the gyros in directions to maintain their spin axes 30 and 38 perpendicular. Since each gyro is precessed an equal amount towards the perpendicular condition, the position of each of their spin axes 30 and 38 represents the average performance of both gyros in azimuth.

In order to provide a heading signal that is the average of the two positions of the spin axes 30 and 38, the output of synchro 60 may be connected to a synchro control transformer 65 or may be connected by lead 68 to any other device which is capable of utilizing an extremely accurate heading signal having a phase and amplitude depending upon the sense and amount of the heading deviation.

The output of synchro control transformer 65 is amplified in amplifier 67 to drive motor 66 in a direction and through an angle depending upon the phase and amplitude of the heading signal. The output shaft of motor 66 drives generator 71, the rotor of synchro control transformer 65, the rotor of synchro resolver 51, and also may provide an output shaft rotation, all in accordance with the averaged heading signal. Motor 66 continues to drive the rotor of synchro control transformer 65 until the output of synchro 65 goes to zero at which time a measure of the heading of the aircraft may be read on compass card 72.

In the preferred embodiment shown in Fig. 1, at any particular time assembly 22 or 23 may be providing the necessary error signals to control either the roll or pitch servo systems, depending upon the attitude of the craft. It is understood, of course, that assemblies 22 and 23 continuously provide substantially duplicate azimuth information and have their spin axes 30 and 38 perpendicular. Assuming any arbitrary position of the spin axes 30 and 38, other than the special condition shown in Fig. 1, the output of synchro 28 will be indicative of the lack of perpendicularity between inner horizontal gimbal 29 and inner vertical gimbal 25. Simultaneously, the output of synchro 53 indicates a lack of perpendicularity between inner horizontal gimbal 35 and inner vertical gimbal 33.

The signals from synchros 50 and 53 are in terms of space coordinates and must be transposed by means of synchro resolver 51 into aircraft coordinates in accordance with the teaching of the aforementioned Hays patent. Thus, the outputs of synchros 50 and 53 are connected to resolver 51 after being amplified in amplifiers 52 and 54, respectively. The output signals of synchro resolver 51 are indicative of the roll and pitch error and are supplied to summing amplifiers 73 and 83, respectively. The output of amplifier 73 energizes motor 74 to drive generator 75 and roll gimbal 14, the latter through gearing 76, to a horizontal plane containing both inner gimbals 27 and 35. Synchro 80 has its rotor adapted to be positioned in accordance with the position of roll gimbal 14 and the output from the stator thereof is a signal proportional to the true roll of the aircraft.

The pitch error signal from resolver 51 is amplified in amplifier 83 to drive motor 82 which in turn drives generator 84. Motor 82 also drives through gearing 85 to maintain the pitch gimbals 32 and 24 perpendicular to the horizontal plane containing both inner gimbals 27 and 35 and therefore vertical. The rotor of synchro 86 is also driven by motor 82 to provide an output indicative of the true pitch of the aircraft thereby providing a gyroscopically stabilized platform having outputs that are an extremely accurate measure of the heading, roll, and pitch of the aircraft.

While the preferred embodiment of the invention has been described with respect to a gyroscopically stabilized platform having directional gyroscope assemblies with substantially identical directional gyros therein, it is within the scope of the present invention to average the output of any two gyroscopes around any two corresponding axes by precessing the gyroscopes to maintain a predetermined relationship between said axes in order that an average signal may be obtained that is superior to either of the individual signals. The gyroscopes do not necessarily have to be mounted on a platform nor do they have to be the same type of gyro.

In addition, the averaged output does not necessarily have to be taken from one synchro of a synchro data transmission system as shown in Fig. 1 but, in lieu thereof, additional signal generators could be utilized to provide the output signal, or any other suitable arrangement could be used, the showing in Fig. 1 being merely for convenience of explanation.

It will also be appreciated that with the spin axes of two directional gyroscopes oriented substantially perpendicular with respect to each other as shown in Fig. 1 and the azimuth output signals from each of the directional gyroscopes averaged as described immediately above, not only is the drift error averaged but the gimbal error due to the Hooke's joint suspension is also substantially cancelled when the aircraft pitches or rolls.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A gyroscopic device comprising a pair of gyroscopes, each gyroscope having at least one reference axis normally oriented in a predetermined angular relation to have a predetermined orientation with respect to the corresponding reference axis of the other gyroscope, said gyroscopes being adapted to provide substantially duplicate information with respect to said axes, means responsive to the movements of said reference axes for providing a measure proportional to the deviations of said axes from said predetermined orientation, and means responsive to said deviation measure for precessing said gyroscopes in directions to eliminate said deviation measure whereby to provide a reference measure which is the average of the positions of said reference axes.

2. A gyroscopic device comprising a pair of gyroscopes, each gyroscope having at least one reference axis normally oriented in a predetermined angular relation to have a predetermined orientation with respect to the corresponding reference axis of the other gyroscope, said gyroscopes being adapted to provide substantially duplicate information with respect to said axes, means responsive to the movements of said reference axes for providing a measure in accordance with the deviations of said axes from said predetermined orientation, means responsive to said deviation measure for precessing said gyroscopes in directions to eliminate said deviation measure, and means responsive to the position of at least one of said axes for providing a reference measure proportional to the average of said substantially duplicate information.

3. A gyroscopic device comprising a pair of gyroscopes having horizontal spin axes normally oriented in a predetermined angular relation to have a predetermined orientation with respect to each other and adapted to provide substantially duplicate azimuth information, means responsive to the movements of said spin axes for providing a measure proportional to the deviations of said spin axes from said predetermined orientation, and means responsive to said deviation measure for precessing said gyroscopes in directions to eliminate said deviation measure whereby to provide an azimuth reference which is the average of the positions of said spin axes.

4. A gyroscopic device comprising a pair of directional gyroscopes having horizontal spin axes normally oriented substantially perpendicular with respect to each other and adapted to provide substantially duplicate azimuth information, signal generating means responsive to the horizontal movements of said spin axes for providing a signal proportional to the deviations of said spin axes from said perpendicular position, means responsive to said deviation signal for precessing said gyroscopes in directions to eliminate said deviation signal, and means responsive to the position of at least one of said spin axes for providing a signal proportional to the average of said substantially duplicate azimuth information.

5. A gyroscopic device comprising, a housing, a first directional gyroscope having a first horizontal spin axis, a second directional gyroscope having a second horizontal spin axis, said first and second directional gyroscopes mounted for movement in said housing and adapted to have their spin axes normally maintained substantially perpendicular with respect to each other, means responsive to the horizontal movements of said first and second spin axes for providing a signal proportional to their deviation from said perpendicular condition, means responsive to said deviation signal for precessing said first and second gyroscopes in directions to maintain said first and second spin axes substantially perpendicular, and means responsive to the position of at least one of said spin axes for providing a heading signal proportional to the average position of the spin axes of said first and second gyroscopes.

6. A gyroscopic stable reference comprising, a housing, a first directional gyroscope having a first horizontal spin axis and a first vertical axis, a second directional gyroscope having a second horizontal spin axis and a second vertical axis, said first and second directional gyroscopes mounted for movement in said housing and adapted to have their spin axes normally maintained substantially perpendicular with respect to each other, a first signal generating means responsive to the movements of said first horizontal spin axis about said first vertical axis for providing a signal proportional thereto, a second signal generating means responsive to the movements of said second spin axis about said second vertical axis and adapted to be responsive to the signal from said first signal generating means for providing a signal proportional to the perpendicularity error between said first and second spin axes, first motive means responsive to said error signal for precessing said first gyroscope in a direction to eliminate said error signal, second motive means responsive to said error signal for precessing said second gyroscope in a direction to eliminate said error signal, and means responsive to the position of at least one of said spin axes for providing a heading signal proportional to the average azimuthal positions of said first and second directional gyroscopes.

7. A three-axis gyroscopic stable reference apparatus for dirigible craft comprising a housing, a first gimbal pivotally supported in said housing for movement about the roll axis of said craft, a pair of directional gyroscopes pivotally supported in said first gimbal, said gyroscopes having horizontal spin axes normally oriented substantially perpendicular with respect to each other and adapted to provide substantially duplicate azimuth information, signal generating means responsive to the horizontal movements of said spin axes for providing a signal proportional to the deviations of said spin axes from said perpendicular position, means responsive to said deviation signal for precessing said gyroscopes in directions to eliminate said deviation signal, means responsive to the average horizontal position of at least one of said spin axes for providing a heading signal proportional to the average of said substantially duplicate azimuth information, one of said gyroscopes also being adapted to provide a measure indicative of pitch, the other of said gyroscopes also being adapted to provide a measure indicative of roll, transposition means responsive to said pitch, roll, and heading signals for providing transposed pitch and roll signals, means responsive to said transposed pitch signal for aligning the pitch gimbals of said directional gyroscopes with the gravity vertical, means responsive to the position of the pitch gimbals with respect to said first gimbal for providing a signal proportional to the pitch of said craft, means responsive to the transposed roll signal for positioning said first gimbal for maintaining it horizontal, and means responsive to the position of said first gimbal for providing a signal proportional to the roll of said craft whereby extremely accurate measures of heading, pitch, and roll of said craft are provided.

8. A method of improving the accuracy of gyroscopically derived reference data by reducing the effects of gyroscopic drift including the steps of orienting the reference axis of one of a pair of gyroscopes in a predetermined angular relation to have a predetermined orientation with respect to the corresponding reference axis of the other gyroscope whereby said gyroscopes are adapted to provide substantially duplicate information with respect to said axes, obtaining a measure proportional to the deviations of said reference axes from their predetermined orientations, precessing each of said gyroscopes equally in directions to eliminate said deviations, and obtaining a measure indicative of the position of at least one of said reference axes whereby a reference measure proportional to the average of said substantially duplicate information is provided.

References Cited in the file of this patent

UNITED STATES PATENTS

| | | |
|---|---|---|
| 2,539,772 | Dawson | Jan. 30, 1951 |
| 2,591,697 | Hays | Apr. 8, 1952 |
| 2,729,107 | Braddon | Jan. 3, 1956 |

FOREIGN PATENTS

| | | |
|---|---|---|
| 200,496 | Australia | Dec. 9, 1955 |